US008651512B2

(12) United States Patent
Fukagawa

(10) Patent No.: US 8,651,512 B2
(45) Date of Patent: Feb. 18, 2014

(54) PASSENGER AIRBAG APPARATUS

(75) Inventor: Takami Fukagawa, Tokyo (JP)

(73) Assignee: Takata Corporation, Tokyo (JP)

( * ) Notice: Subject to any disclaimer, the term of this patent is extended or adjusted under 35 U.S.C. 154(b) by 277 days.

(21) Appl. No.: 12/944,503

(22) Filed: Nov. 11, 2010

(65) Prior Publication Data

US 2011/0109068 A1    May 12, 2011

(30) Foreign Application Priority Data

Nov. 11, 2009   (JP) ................................. 2009-257868

(51) Int. Cl.
*B60R 21/20* (2011.01)
*B60R 21/205* (2011.01)

(52) U.S. Cl.
USPC ........................................ 280/728.2; 280/732

(58) Field of Classification Search
USPC .................... 280/728.1, 728.2, 732
See application file for complete search history.

(56) References Cited

U.S. PATENT DOCUMENTS

| | | | |
|---|---|---|---|
| 4,111,457 A * | 9/1978 | Kob et al. ................... | 280/728.2 |
| 5,782,481 A | 7/1998 | Magoteaux | |
| 5,829,777 A | 11/1998 | Sakurai et al. | |
| 6,250,669 B1 * | 6/2001 | Ohmiya ........................ | 280/732 |
| 6,422,589 B1 * | 7/2002 | Ostermann et al. ......... | 280/728.2 |
| 6,422,590 B1 * | 7/2002 | Umezawa et al. .......... | 280/728.2 |
| 7,090,244 B2 * | 8/2006 | Lim ............................ | 280/728.2 |
| 7,150,470 B2 * | 12/2006 | Okada et al. ............... | 280/743.1 |
| 7,255,365 B2 | 8/2007 | Geyer et al. | |
| 7,387,311 B2 * | 6/2008 | Kanno et al. ............... | 280/728.3 |
| 7,686,326 B2 * | 3/2010 | Kim et al. ................... | 280/728.2 |
| 7,878,532 B2 * | 2/2011 | Sasaki et al. ............... | 280/730.1 |
| 8,016,317 B1 * | 9/2011 | Bruyneel et al. ........... | 280/728.2 |
| 2003/0222434 A1 | 12/2003 | Okada et al. | |
| 2009/0184495 A1 * | 7/2009 | Kim et al. ................... | 280/728.2 |
| 2010/0117337 A1 * | 5/2010 | Yamauchi et al. ......... | 280/728.2 |

(Continued)

FOREIGN PATENT DOCUMENTS

DE   1020090 52 752-1   5/2010
EP        1 777 121  A2   4/2007

(Continued)

OTHER PUBLICATIONS

Hiroyuki Sugawara, Airbag Device, May 15, 2008, JPO, JP 2008-110737 A, Machine Translation of Description.*

(Continued)

*Primary Examiner* — James English
(74) *Attorney, Agent, or Firm* — Foley & Lardner LLP

(57) ABSTRACT

The disclosure discloses a passenger airbag apparatus comprising: an airbag configured to inflates and expands from an opening; a retainer configured to comprise a body having substantially rectangular frame-shaped side walls; arm members configured to extend respectively from the side walls along a left and right directions, and to be affixed to the panel; a substantially disk-shaped gas generator attached to the bottom surface of the body; and a support member arranged in a manner that the upper end portion thereof is attached to an outer periphery of the opening and to cover the sides of the airbag, wherein: the retainer further includes hook members provided on the side walls along a front and rear directions, and engage the body with the support member; the body and the hook members are integrally constructed with substantially the same thickness; and the hook members further includes a first rib portion.

5 Claims, 10 Drawing Sheets

(56) References Cited

U.S. PATENT DOCUMENTS

| | | | |
|---|---|---|---|
| 2010/0253048 A1* | 10/2010 | Ooshino et al. | 280/728.2 |
| 2011/0115200 A1* | 5/2011 | Choi et al. | 280/728.2 |
| 2012/0007346 A1* | 1/2012 | Morawietz et al. | 280/728.2 |

FOREIGN PATENT DOCUMENTS

| | | |
|---|---|---|
| JP | 09-150699 | 6/1997 |
| JP | 2001-097162 | 4/2001 |
| JP | 2001-097162 A | 4/2001 |
| JP | 2004-025929 | 1/2004 |
| JP | 2006-281945 | 10/2006 |
| JP | 2006-281945 A | 10/2006 |
| JP | 2007-245876 | 9/2007 |
| JP | 2007-245876 A | 9/2007 |
| JP | 2008-110737 A | 5/2008 |
| JP | 2009-262697 | 11/2009 |
| JP | 2009-262697 A | 11/2009 |
| WO | WO-2009/014047 A1 | 1/2009 |
| WO | WO-2009/051869 A1 | 4/2009 |

OTHER PUBLICATIONS

Ido et al., Air Bag Device, Jan. 29, 2004, JPO, JP 2004-025929 A, Machine Translation of Description.*

European Search Report received in Feb. 28, 2011 for European Application No. 10190817.6 (5 pgs).

Notice of Reasons for Rejection; JP Application No. 2009-257868; Mar. 19, 2013; 3 pgs.

* cited by examiner

PASSENGER AIRBAG APPARATUS

BACKGROUND OF THE INVENTION

1. Field of the Invention

The present invention relates to a passenger airbag apparatus provided in a vehicle such as an automobile or the like.

2. Description of the Related Art

A passenger airbag apparatus which, when an emergency occurs, activates a gas generator, inflates an airbag provided in a panel and restrains the passenger in the passenger seat has been known since the past (for example, refer to JP, A, 2007-245876).

This passenger airbag apparatus is equipped with an airbag which inflates by means of gas from a gas generator (inflator), and normally, the airbag is stored folded in a retainer (case). When an emergency occurs, such as collision or rollover of the automobile, the gas generator emits gas, and this gas is supplied inside the airbag, and due to its pressure, the airbag inflates and expands.

Also, hook members are provided in this passenger airbag apparatus. These hook members connect with a support member (leg-like piece) arranged so as to cover the sides of the airbag which is stored folded in the retainer.

In the above-described prior art, the basic configuration of an airbag device is disclosed, wherein the retainer and the support member are connected by means of hook members, which are provided on the retainer, engaging with through-holes (hook holes), which are provided in the support member.

To attempt to optimize the airbag device having such a configuration, a reduction in weight of the retainer must be pursued.

SUMMARY OF THE INVENTION

The object of the present invention is to provide a passenger airbag apparatus which attempts to reduce the weight of the retainer.

MEANS FOR SOLVING THE PROBLEMS

In order to achieve the above-mentioned object, according to the first invention, there is provided a passenger airbag apparatus comprising: an airbag configured to inflates and expands between a panel and a passenger from an opening provided in the panel, the panel constituting an inner wall of a vehicle; a retainer configured to comprise a body having a substantially rectangular bottom surface and substantially rectangular frame-shaped side walls and to house the airbag in a folded state; arm members configured to extend respectively from the side walls along a left and right directions of the vehicle in a state where the retainer is attached to the vehicle, and to be affixed to the panel; a substantially disk-shaped gas generator attached to the bottom surface of the body and configured to supply gas to the airbag; and a support member arranged in a manner that the upper end portion thereof is attached to an outer periphery of the opening of the panel and to cover the sides of the airbag in the folded state, wherein: the retainer further includes hook members provided on the side walls along a front and rear directions of the vehicle in the state where the retainer is attached to the vehicle, and engage the body with the support member by passing through through-holes provided in the support member; the body and the hook members are integrally constructed with substantially the same thickness by extrusion molding; and the hook members further includes a first rib portion.

In the first invention, a retainer which houses a passenger-side airbag in the folded state is stored inside a panel of the vehicle. The retainer comprises a body having a substantially rectangular bottom surface and substantially rectangular frame-shaped side walls, and hook members for engaging the body with a support member. At this time, the body and the hook members are integrally constructed with substantially the same thickness by a series of extrusion molding processes using one piece of sheet metal, for example. As a result, the weight of the retainer can be reduced, compared to the case where the body is formed by connecting multiple separate members by welding and the hook members are formed by connecting separate members with the body. Also, since welding is not required for connection, the strength of the retainer can be increased, and the manufacturing process can be simplified and the cost reduced. Additionally, the strength of the hook members can be increased by providing a first rib on the hook members. As a result, the strength of the hook members is not unsatisfactory even when they are integrally molded as described above. Also, due to the fact that the body and hook members have the same thickness, the deviation in rigidity of the retainer as a whole can be reduced, and the strength of the retainer can be increased.

In addition, when the airbag inflates and expands, stress operates such that the inflated airbag spreads the body from the inside toward the outside, and deformation of the opening of the body (so-called "fishmouth") may occur. In particular, the larger the height dimension of the body, the more easily it is affected by the above-described stress, and the greater the tendency for fishmouth to occur.

In the first invention, due to the fact that the body and hook members are integrally constructed with substantially the same thickness, the strength of the retainer can be increased as described above, and in addition, the above-described stress can be distributed when the airbag inflates and expands. As a result, the above-described fishmouth can be reduced. Also, by using the above-described extrusion molding technique, the body can be molded such that the height dimension of the body is small. Therefore, the above-described fishmouth when the airbag expands can be further reduced. As a result, it is possible to avoid the problem that when an inflated and expanded airbag is replaced with a new airbag, it is difficult to remove the retainer which holds the inflated and expanded airbag from inside the panel, or it cannot be removed from inside the panel and the panel itself must be replaced. Therefore, costs can be reduced.

According to the second invention, in the passenger airbag apparatus according to the first invention, the body further includes a flange having a shape that widens toward an edge side, on an upper end portion of an entire periphery of the substantially rectangular frame-shaped side walls.

In the second invention, due to the fact that a flange is provided on the side walls of the body which is constructed integrally by extrusion molding, the flange can be provided so as to connect to the entire periphery of the top opening of the body.

According to the third invention, in the passenger airbag apparatus according to the first invention, the first rib portion of the hook members extends along a direction of protrusion of the hook member; and the body further includes second rib portions formed so as to be continuous respectively with the first rib portions of the hook members.

In the third invention, the body has a second rib, such that it connects with the first rib of the hook members. Thus, the strength of the retainer can be further increased by providing long, integrally-constructed ribs.

According to the fourth invention, in the passenger airbag apparatus according to the first invention, the body has the same height dimension along the entire periphery of the substantially rectangular frame-shaped side walls.

In the fourth aspect of the present invention, the deviation in rigidity of the body can be reduced due to the fact that the height dimension is the same around the entire periphery of the side walls of the body. As a result, the strength of the retainer can be increased.

According to the present invention, the weight of the retainer can be reduced.

DETAILED DESCRIPTION OF THE PREFERRED EMBODIMENTS

An embodiment of the present invention will be described below with reference to the attached drawings. In the descriptions below, the vehicle front and rear directions and the vehicle left and right directions are the front and rear directions and left and right directions of the vehicle as seen by a passenger seated in the passenger seat of the vehicle. Also, "front and rear directions," "up and down directions" and "left and right directions" as seen by the passenger seated in the passenger seat of the vehicle are used as phrases indicating directions in space.

Figure 1A:
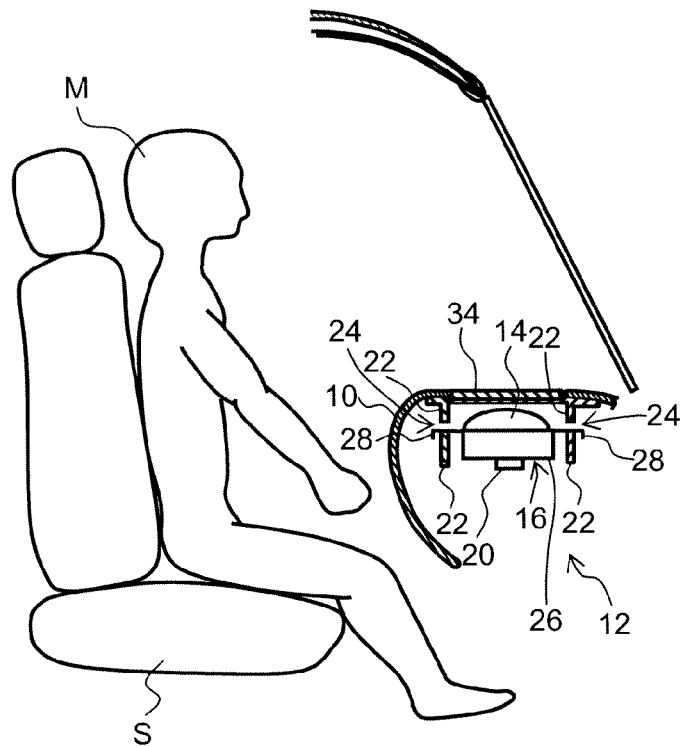
FIGS. 1A and 1B are side sectional views of a passenger airbag apparatus according to an embodiment of the present invention.
Figure 1B:
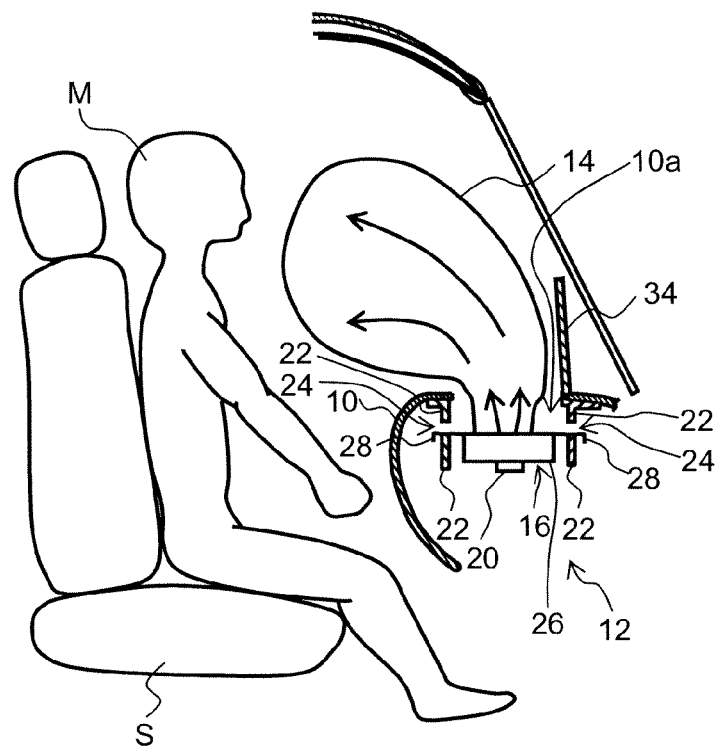
Figure 2A:
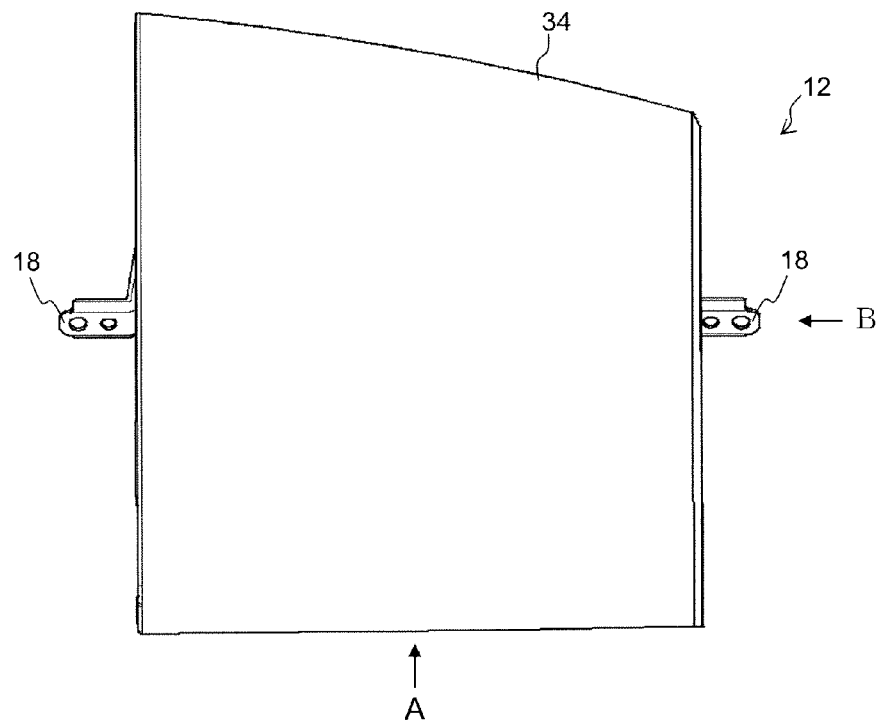
FIG. 2A is a top view and FIG. 2B is a bottom view illustrating the exterior of a passenger airbag apparatus.
Figure 2B:
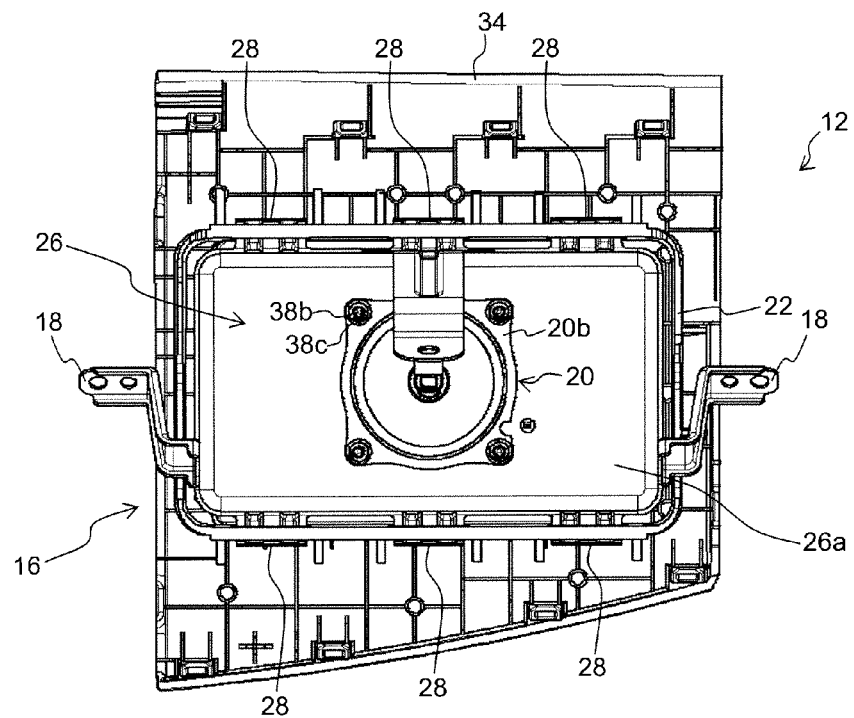
Figure 3A:
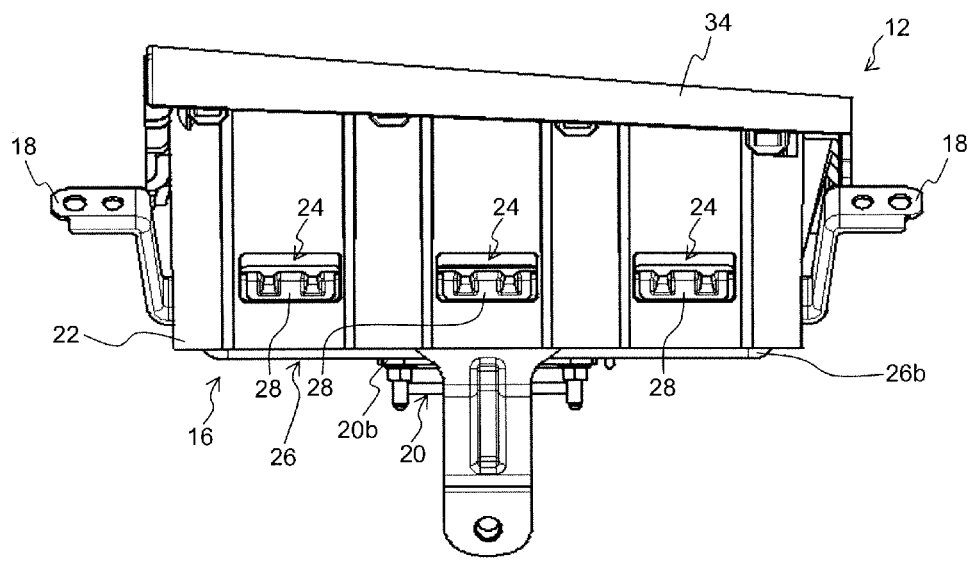
FIG. 3A is a view looking from direction A in FIG. 2A.
Figure 3B:
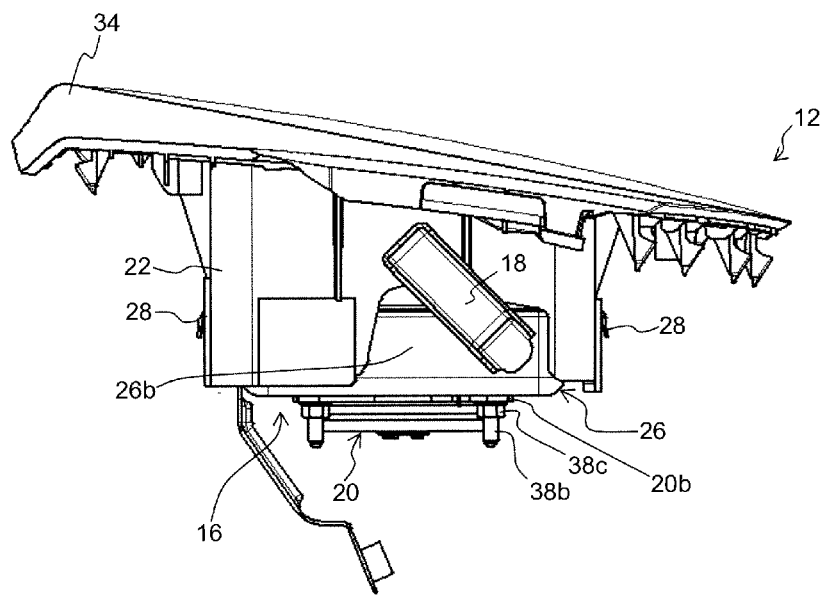
FIG. 3B is a view looking from direction B in FIG. 2A.

FIG. 1 is a side sectional view illustrating a schematic configuration of a passenger airbag apparatus of this embodiment in the state where it is arranged inside an instrument panel. FIG. 1A illustrates the normal state where the airbag is not inflated and expanded, and FIG. 1B illustrates the state while the airbag is being inflated and expanded. Also, FIG. 2 and FIG. 3 are drawings illustrating the exterior configuration of a passenger airbag apparatus. FIG. 2A is an exterior view looking at the passenger airbag apparatus from the top, and FIG. 2B is an exterior view looking at the passenger airbag apparatus from the bottom. FIG. 3A is an exterior view looking at the passenger airbag apparatus from the front, and FIG. 3B is an exterior view looking at the passenger airbag apparatus from the right.

In FIGS. 1A, 1B, 2A, 2B, 3A and 3B, an instrument panel 10 which constitutes the inner wall of the vehicle is arranged in front of (to the right of in FIG. 1) a passenger M seated in a passenger seat S. A passenger airbag apparatus 12 of this embodiment is arranged inside the instrument panel 10. The passenger airbag apparatus 12 comprises an airbag 14, a retainer 16, a plurality of arm members 18, a substantially disk-shaped inflator 20 (gas generator) and a support member 22.

The airbag 14 inflates and comes out from an opening 10a provided in the instrument panel 10, and it inflates and expands between the instrument panel 10 and the passenger M.

The retainer 16 houses the airbag 14 in the folded state. This retainer 16 comprises a body 26 and a plurality of hooks 28 (hook members). The body 26 comprises a substantially rectangular bottom surface 26a and substantially rectangular frame-shaped side walls 26b, and an opening 30 (refer to FIG. 4 and so forth) on the side opposite the bottom surface 26a. The hooks 28 are provided in the vehicle front and rear directions on the body 26, in a state where they attach the retainer 16 to the vehicle. The hooks 28 engage the retainer 16 with the support member 22 by passing through the below-described hook holes 24 provided in the support member 22 and locking.

The arm members 18 are attached by welding, for example, to side walls 26b and 26b so as to extend from each side wall 26b in the vehicle left and right directions in the state where the retainer 16 is attached to the vehicle. Due to the fact that these arm members 18 are attached to an arm member mounting part (not illustrated) inside the instrument panel 10, they can affix the retainer 16 to the instrument panel 10. Furthermore, illustration of the arm members 18 is omitted in FIG. 1A and FIG. 1B.

The inflator 20 is attached to an opening 32 (refer to FIG. 5 and so forth) formed in the bottom surface 26a of the body 26, and it supplies gas to the airbag 14.

The upper end portion of the support member 22 is attached to the outer periphery of the opening 10a of the instrument panel 10. This support member 22 is arranged so as to cover the sides of the airbag 14 in the folded state. Furthermore, as shown in FIG. 3A and FIG. 3B, in this embodiment, the support member 22 is in the form of a frame which surrounds the body 26 from the rear face of a lid member 34 described below. On the portions of this support member 22 that overlap the hooks 28, hook holes 24 (through-holes) for the respective applicable hooks 28 to pass through are provided.

Also, a lid member 34 which normally (the state shown in FIG. 1A) blocks the opening 10a is provided on the applicable opening 10a. When the inflator 20 operates (the state shown in FIG. 1B), a breakable tear line (not illustrated) formed between the lid member 34 and opening 10a breaks, and the lid member 34 rotates (in the example shown in FIG. 1B, the passenger M side is opened), and the airbag 14 inflates and comes out toward the passenger M side.

In the passenger airbag apparatus 12 configured in this way, normally, the airbag 14 is stored folded inside the retainer 16, as shown in FIG. 1A. When an emergency occurs, such as collision of the vehicle, the inflator 20 operates by a control signal being input from a control device (not illustrated). As a result, an ignition agent inside is ignited and gas is emitted, and as a result, internal pressure rises, and the airbag 14 that was in the folded state begins to inflate and expand. As shown in FIG. 1B, by the force of its expansion, the airbag 14 breaks the tear line and causes the lid member 34 to open, and expands to the outside of the retainer 16 and instrument panel 10, inflating and expanding toward the passenger M seated in the passenger seat S. As a result, the inflated and expanded airbag 14 restrains the upper half of the body of the passenger M.

Figure 4:
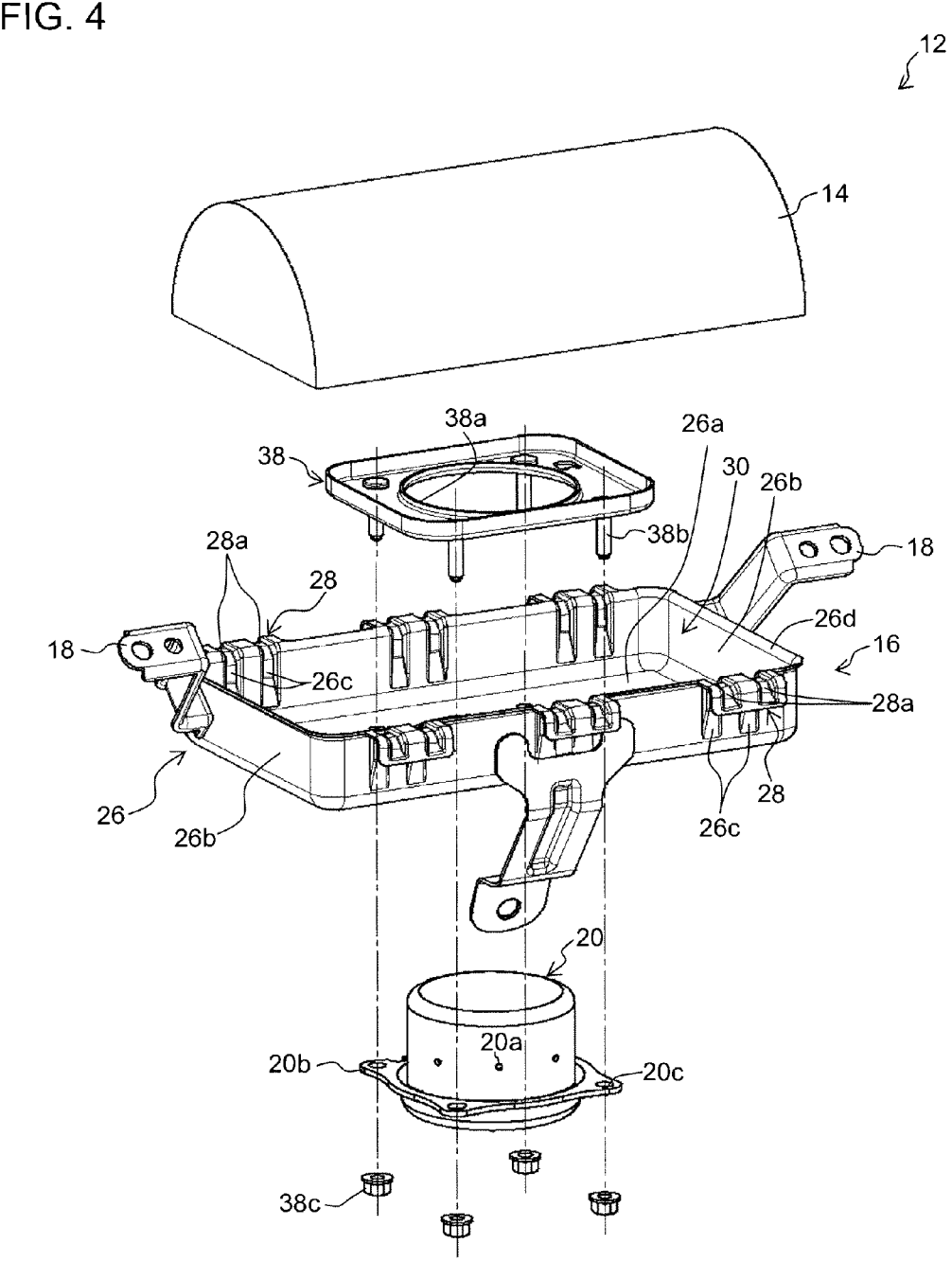
FIG. 4 is an exploded perspective view of a passenger airbag apparatus.
Figure 5A:
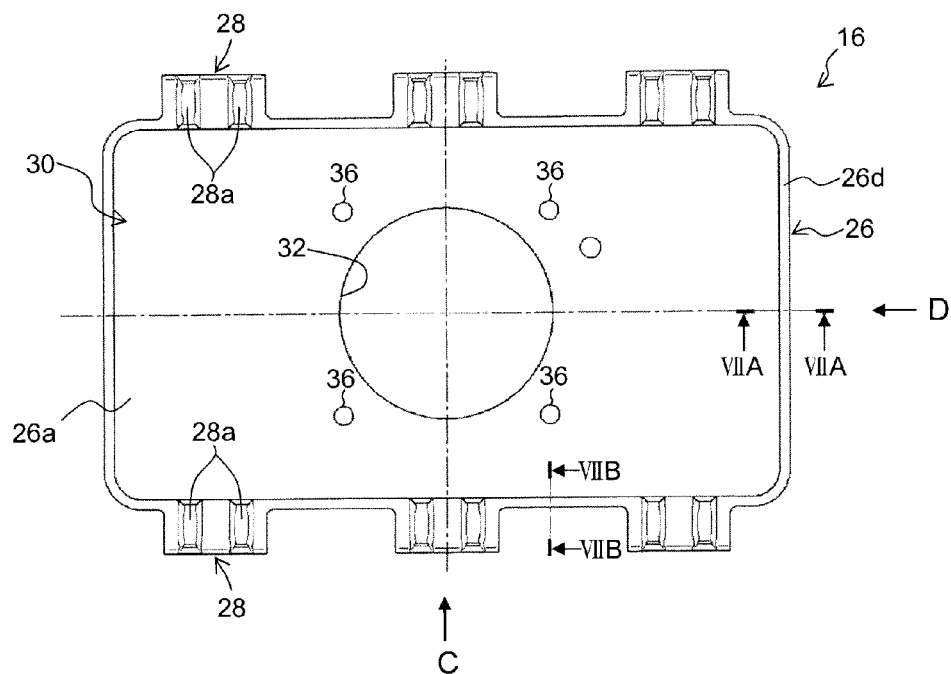
FIG. 5A is a top view and FIG. 5B is a bottom view of a body of a retainer.
Figure 5B:
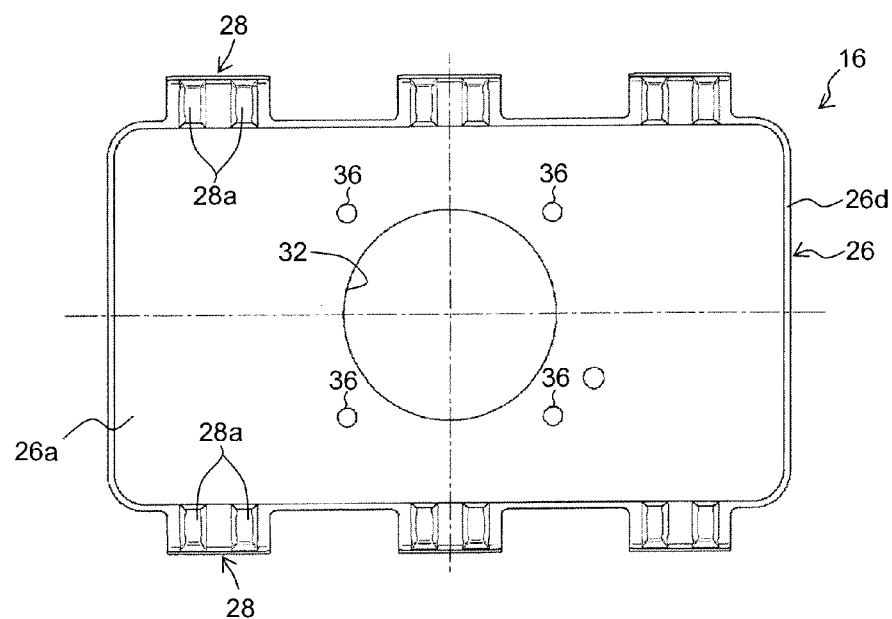
Figure 6A:
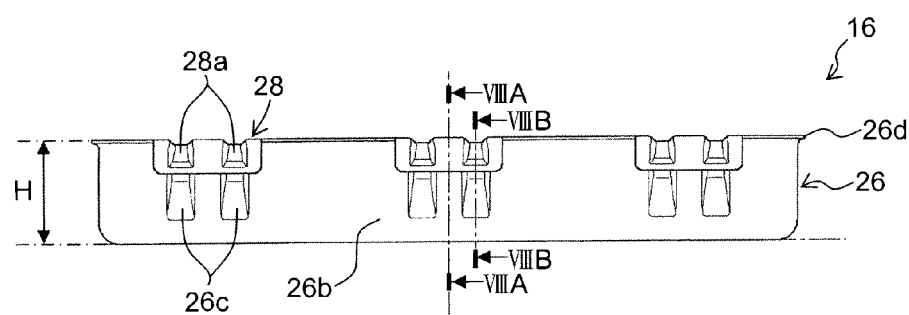
FIG. 6A is a view looking from direction C in FIG. 5A.
Figure 6B:
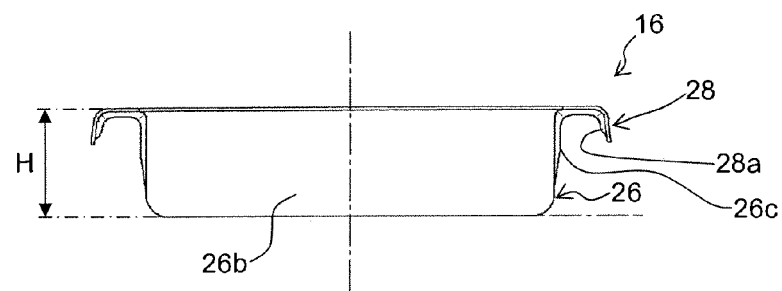
FIG. 6B is a view looking from direction D in FIG. 5A.
Figure 7A:
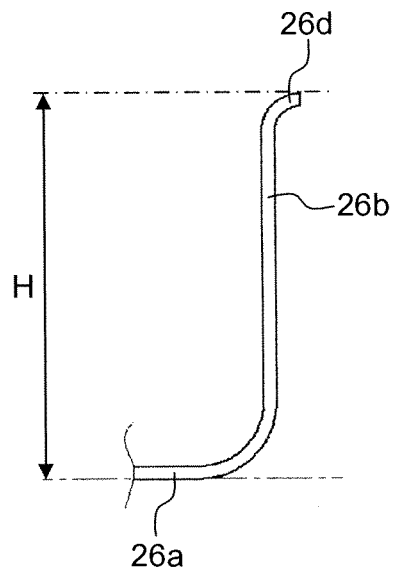
FIG. 7A is a transverse sectional view along section VIIA-VIIA in FIG. 5A.
Figure 7B:
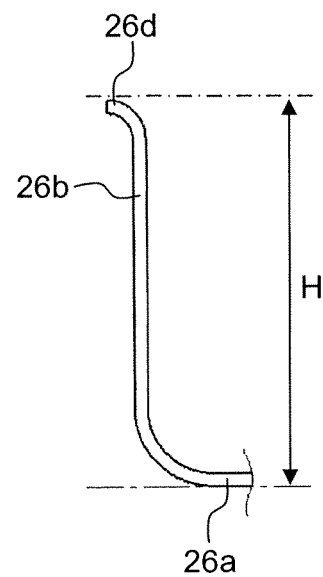
FIG. 7B is a view showing the transverse sectional view along section VIIB-VIIB in FIG. 5A rotated 90°.
Figure 8A:
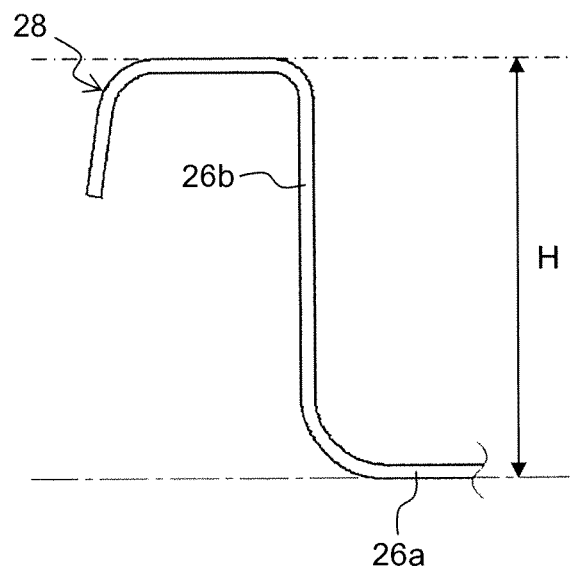
FIG. 8A is a transverse sectional view along section VIIIA-VIIIA in FIG. 6A.
Figure 8B:
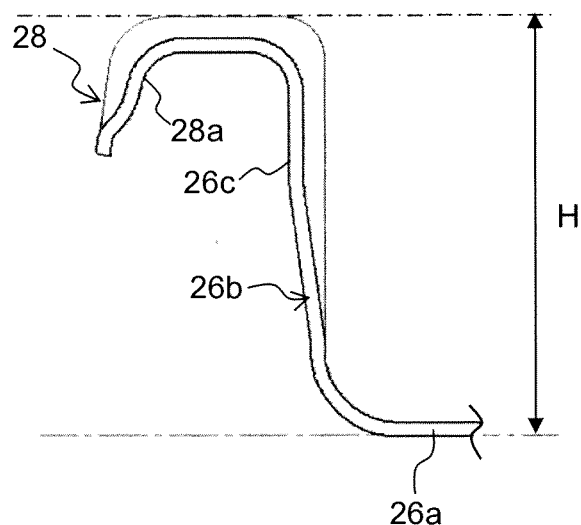
FIG. 8B is a view showing the transverse sectional view along section VIIIB-VIIIB in FIG. 6A.

FIG. 4 is a part development view of the passenger airbag apparatus 12. FIGS. 5-8 are drawings which explain the detailed structure of the retainer 16. FIG. 5A is an exterior view looking at the retainer 16 from the top, and FIG. 5B is an exterior view looking at the retainer 16 from the bottom. FIG. 6A is an exterior view looking at the retainer 16 from the front, and FIG. 6B is an exterior view looking at the retainer 16 from the right. FIG. 7A is a transverse sectional view along section VIIA-VIIA in FIG. 5A, and FIG. 7B is a view showing the transverse sectional view along section VIIB-VIIB in FIG. 5A rotated 90°. FIG. 8A is a transverse sectional view along section VIIIA-VIIIA in FIG. 6A, and FIG. 8B is a transverse sectional view along section VIIIB-VIIIB in FIG. 6A. To avoid confusion in the diagrams, FIG. 4 is a simplified illustration of the structure of the airbag 14, omitting the lid member 34 and support member 22, and FIGS. 5-8 show only the body 26 of the retainer 16.

In FIGS. 4, 5A, 5B, 6A, 6B, 7A, 7B, 8A and 8B, the passenger airbag apparatus 12 comprises the airbag 14, the retainer 16, the aim members 18, the inflator 20 and the support member 22, as described above (refer to FIGS. 1-3).

As shown in FIG. 4, the airbag 14 is affixed to the retainer 16 via a pressure ring 38 described below.

As described above, the retainer 16 has a body 26, which comprises the bottom surface 26a and side walls 26b, and hooks 28. It is structured by extrusion molding, for example, from a single metal sheet. The body 26 and hooks 28 are integrally formed with substantially the same thickness by the extrusion molding process described above. The manufacturing process by extrusion molding of the retainer 16 is explained in FIG. 9 and FIG. 10 described below.

The hooks 28 are provided facing outward from the rim of the vehicle front and rear directions in the opening 30 provided in the body 26 (in other words, in the vehicle front and rear directions of a flange 26d described below). Also, on each hook 28, a strength-reinforcing rib 28a (first rib, appropriately called "first rib 28a" hereinafter), of which the outer periphery side has a protruding shape and the inner periphery side has an indented shape, is provided along the direction of protrusion of the applicable hook 28. On the body 26, ribs 26c are provided, of which the inside of the side walls 26b has an indented shape and the outside of the side walls 26b has a protruding shape. The ribs 26c (second ribs, appropriately called "second ribs 26c" hereinafter) are formed so as to be continuous with the first ribs 28a. Therefore, the first ribs 28a and second ribs 26c are integrally provided in the long direction along the body 26 from the hooks 28.

Also, the body 26 has the same height dimension along the entire periphery of the side walls 26b (dimension H in the illustrated example). On the upper end portion of the entire periphery of the side walls 26b of the body 26 (in other words, the rim of the opening 30), a flange 26d is provided, which has a shape that widens toward the edge side. Also, as shown in FIGS. 5A and 5B, in the center of the bottom surface 26a of the body 26, an opening 32 is formed, for guiding the inflator 20 inside the airbag 14. Surrounding this opening 32, a plurality of bolt holes 36 are provided.

Meanwhile, a plurality of gas emission outlets 20a are provided on the side periphery surface of the inflator 20. A fixing flange 20b is provided from the side periphery surface of the inflator (further downward than the gas emission outlets 20a) (also refer to FIGS. 2B, 3A and 3B). On this flange 20b, a plurality of bolt holes 20c are provided. The tip side (top side) of the inflator 20 is mounted in the opening 32.

Also, the pressure ring 38 is a member for affixing the airbag 14 to the retainer 16. In the center of the pressure ring 38, an opening 38a is formed for guiding the inflator 20 inside the airbag 14. Surrounding the opening 38a, a plurality of bolt holes (not illustrated) are provided, and a bolt 38b is inserted through each bolt hole (or the pressure ring 38 can be integrally equipped with bolts 38b). After the bolts 38b are inserted in the bolt holes 36 of the retainer 16 and the bolt holes 20c of the inflator 20 in that order, they are finally tightened by nuts 38c (refer also to FIGS. 2B, 3A and 3B).

The passenger airbag apparatus 12 of the above configuration is affixed inside the instrument panel 10 (refer to FIG. 1) by the bolts 38b and arm members 18.

Figure 9A:
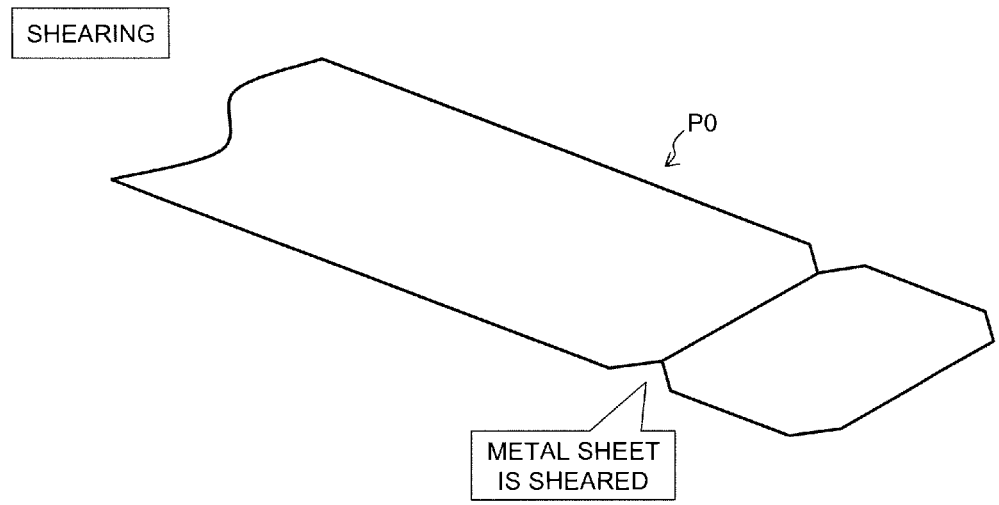
FIGS. 9A and 9B are explanatory diagrams schematically illustrating an example of the manufacturing process of a retainer by extrusion molding.
Figure 9B:
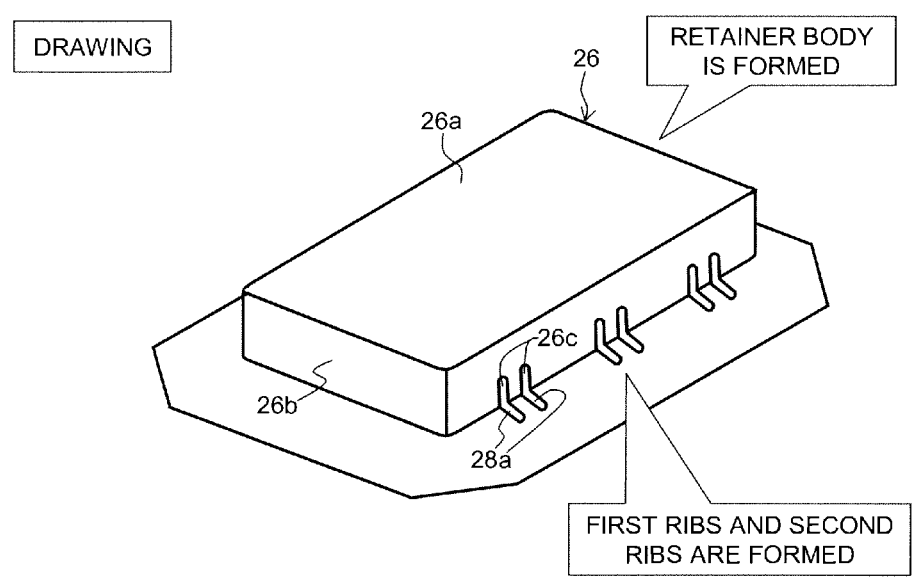
Figure 10A:
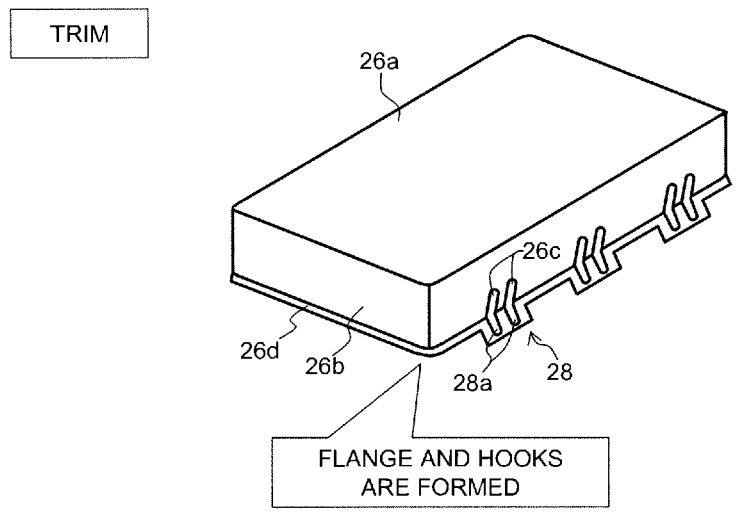
FIGS. 10A and 10B are explanatory diagrams schematically illustrating an example of the manufacturing process of a retainer by extrusion molding.
Figure 10B:
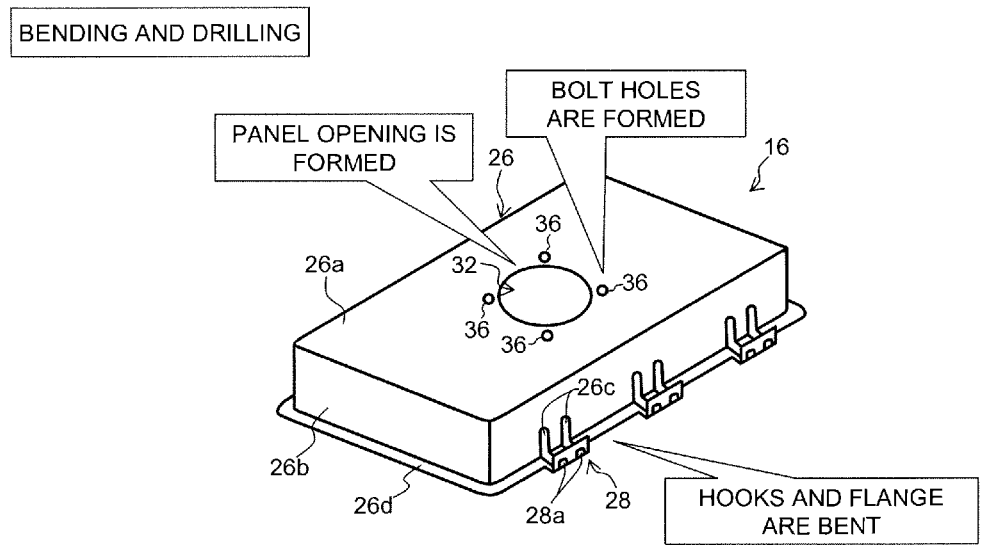

FIG. 9 and FIG. 10 are diagrams schematically illustrating an example of the manufacturing process of the retainer 16 by the extrusion molding technique. Furthermore, to avoid confusion in the diagrams, FIG. 9 and FIG. 10 are simplified illustrations of the respective forms, wherein FIG. 9A, FIG. 9B, FIG. 10A and FIG. 10B, in that order, represent each step in a time series.

In the example shown in FIGS. 9A, 9B, 10A and 10B, the retainer 16 is manufactured by extrusion molding accompanied by pressing, which utilizes shearing, drawing, trimming, bending, drilling and so forth. Extrusion molding is a processing method by which products of the same shape are continuously molded by extruding a material having a long shape.

That is, as shown in FIG. 9A, the prescribed metal sheet PO which is the material for manufacturing the retainer 16 is sheared to the prescribed size by shearing. Subsequently, as shown in FIG. 9B, by performing drawing using a prescribed die on the metal sheet PO that was sheared to the above-described prescribed size, a body 26 comprising the side walls 26b having a substantially rectangular frame shape and the bottom surface 26a having a substantially rectangular shape is formed. Furthermore, although not illustrated, the above-described opening 30 (refer to FIGS. 4 and 5, etc.) is formed on the top side of the body 26 (in FIGS. 9 and 10, the bottom side of the body 26 is on top). By using the drawing process, the body 26 can be molded seamlessly into a box shape. Also, in the drawing process, at the same time, the above-described second ribs 26c and first ribs 28a are formed so as to be continuous, on predetermined portions of the body 26 and on predetermined portions formed subsequently as the hooks 28.

Then, as shown in FIG. 10A, the periphery of the opening 30 of the body 26 formed as described above is shaped into a prescribed shape by trimming. As a result, a flange 26d is formed so as to be continuous with the upper end portion of the entire periphery of the side walls 26b (in other words, with the entire periphery of the opening 30), and the hooks 28 are also formed. Furthermore, at this time, the flange 26d does not have a shape which widens sufficiently on the edge side as described above, and the hooks 28 do not have a hook shape as described above. The body 26 and hooks 28 formed in this way are integrally constructed with substantially the same thickness.

Subsequently, as shown in FIG. 10B, the flange 26d formed as described above is bent outward from the edge of the opening 30 of the body 26 by a bending process, and as a result, it is made into a shape which widens toward the edge side. Additionally, the hooks 28 formed as described above are bent to the outside of the side surface of the body 26 by a bending process, and as a result, they are made into a hook shape. Also, by drilling, an opening 32 is formed in the center of the bottom surface of the body 26, and a plurality of bolt holes 36 are formed surrounding this opening 32. Also, appropriately, if shaving or the like is performed, it results in the retainer 16 described by FIGS. 4-8, etc.

According to the passenger airbag apparatus 12 of this embodiment configured as described above, the following advantages are obtained.

That is, in this embodiment, the retainer 16 which houses the airbag 14 in the folded state is stored inside the instrument panel 10. The body 26 and hooks 28 are provided in this retainer 16, and this body 26 and hooks 28 are integrally constructed with substantially the same thickness by extrusion molding described above. As a result, the weight of the retainer 16 can be reduced, compared to the case where the body 26 is formed by connecting multiple separate members by welding and the hooks 28 are formed by connecting separate members with the body 26. Also, since welding is not required for connection, the strength of the retainer 16 can be increased, and the manufacturing process can be simplified and the cost reduced. Additionally, the strength of the hooks 28 can be increased by providing a first rib 28a on the hooks 28. As a result, the strength of the hooks 28 is not unsatisfactory even when they are integrally molded as described above. Also, due to the fact that the body 26 and hooks 28 have the same thickness, the deviation in rigidity of the retainer 16 as a whole can be reduced, and the strength of the retainer 16 can be increased.

In addition, when the airbag 14 inflates and expands, stress operates such that the inflated airbag 14 spreads the body 26 from the inside toward the outside, and deformation of the opening 30 of the body 26 (so-called "fishmouth") may occur. In particular, the larger the height dimension of the body 26, the more easily it is affected by the stress, and the greater the tendency for fishmouth to occur.

In this embodiment, due to the fact that the body 26 and hooks 28 are integrally constructed with substantially the same thickness, the strength of the retainer 16 can be increased as described above, and in addition, the stress can be distributed when the airbag 14 inflates and expands, and fishmouth can be reduced. Also, by using the extrusion molding technique as described above, the body 26 can be molded such that the height dimension of the body 26 is small. Therefore, fishmouth when the airbag 14 expands can be further reduced. As a result, it is possible to avoid the problem that when an inflated and expanded airbag 14 is replaced with a new airbag, it is difficult to remove the retainer 16 which holds the inflated and expanded airbag 14 from inside the instrument panel, or it cannot be removed from inside the instrument panel 10 and the relevant instrument panel 10 itself must be replaced. Therefore, costs can be reduced.

Also, in this embodiment, in particular, the flange 26d can be provided so as to be continuous with the entire periphery of the opening 30 due to the fact that the flange 26d is provided on the upper end portion of the side walls 26b of the body 26 which is integrally constructed by extrusion molding as described above.

In addition, in this embodiment, in particular, the first ribs 28a of the hooks 28 extend along the direction of protrusion of the applicable hook 28. Also, the body 26 has second ribs 26c formed so as to be continuous with the first ribs 28a of the hooks 28. Thus, the strength of the retainer 16 can be further increased by providing this type of long, integrally-constructed ribs.

Additionally, in this embodiment, in particular, the body 26 has the same height dimension along the entire periphery of the side walls 26b. As a result, the deviation in rigidity of the body 26 can be reduced. As a result, the strength of the retainer 16 can be increased.

Furthermore, the embodiment described above is a preferred example of the present invention, but the present invention is not limited thereto, and variations are possible without deviating from the spirit and scope of the present invention.

What is claimed is:

1. A passenger airbag apparatus comprising:
   an airbag configured to inflate and expand between a panel and a passenger from an opening in said panel, the panel constituting an inner wall of a vehicle;
   a retainer configured to include a body including a substantially rectangular bottom surface and substantially rectangular frame-shaped side walls and to house said airbag in a folded state;
   arm members configured to extend from said side walls along left and right directions of said vehicle in a state where said retainer is attached to said vehicle, and to be affixed to said panel;
   a substantially disk-shaped gas generator attached to said bottom surface of said body and configured to supply gas to said airbag; and
   a support member arranged in a manner that the upper end portion of the support member is attached to an outer periphery of said opening of said panel and to cover sides of said airbag in the folded state, wherein:
   said retainer further includes hook members on said side walls along front and rear directions of said vehicle in a state where said retainer is attached to said vehicle, and configured to engage said body with said support member by passing through through-holes in said support member;
   said body and said hook members are integrally constructed with substantially the same thickness by extrusion molding;
   wherein the body further includes a flange having a shape that widens toward an edge side, on an upper end portion of an entire periphery of said substantially rectangular frame-shaped side walls;
   wherein each hook member includes a plurality of horizontally spaced apart rib portions extending from the flange downwards to the side walls.

2. The passenger airbag apparatus according to claim 1, wherein:
   said plurality of horizontally spaced apart rib portions of said hook members extend along a direction of protrusion of one of the hook members; and
   said body further includes second rib portions that are continuous with said plurality of horizontally spaced apart rib portions of said hook members.

3. The passenger airbag of claim 1, wherein:
   a shape of said bottom surface of said retainer is a rectangle including two short sides and two long sides;
   a plurality of said hook members are arranged so as to be provided in the linear symmetry with respect to a bisector of said two short sides as well as be provided in the linear symmetry with respect to a bisector of said two long sides, and
   each of said hook members include a rib pair consisting of a plural of the first rib portions as one set.

4. A passenger airbag apparatus comprising:
   an airbag configured to inflate and expand between a panel and a passenger from an opening in said panel, the panel constituting an inner wall of a vehicle;

a retainer configured to include a body having a substantially rectangular bottom surface and substantially rectangular frame-shaped side walls and to house said airbag in a folded state;

arm members configured to extend from said side walls along left and right directions of said vehicle in a state where said retainer is attached to said vehicle, and to be affixed to said panel;

a substantially disk-shaped gas generator attached to said bottom surface of said body and configured to supply gas to said airbag; and a support member arranged in a manner that the upper end portion of the support member is attached to an outer periphery of said opening of said panel and to cover sides of said airbag in the folded state, wherein:

said retainer further includes hook members on said side walls along front and rear directions of said vehicle in a state where said retainer is attached to said vehicle, and configured to engage said body with said support member by passing through through-holes in said support member;

said body and said hook members are integrally constructed with substantially the same thickness by extrusion molding;

wherein the body has a same height dimension along an entire periphery of said substantially rectangular frame-shaped side walls;

wherein each hook member includes a plurality of horizontally spaced apart rib portions extending from the periphery downwards to the side walls.

5. A passenger airbag apparatus comprising:

an airbag configured to inflate and expand between a panel and a passenger from an opening in said panel, the panel constituting an inner wall of a vehicle;

a retainer configured to include a body including a substantially rectangular bottom surface and substantially rectangular frame-shaped side walls and to house said airbag in a folded state;

arm members configured to extend from said side walls along left and right directions of said vehicle in a state where said retainer is attached to said vehicle, and to be affixed to said panel;

a substantially disk-shaped gas generator attached to said bottom surface of said body and configured to supply gas to said airbag; and a support member arranged in a manner that the upper end portion of the support member is attached to an outer periphery of said opening of said panel and to cover sides of said airbag in the folded state, wherein:

said retainer further includes hook members on said side walls along front and rear directions of said vehicle in a state where said retainer is attached to said vehicle, and configured to engage said body with said support member by passing through through-holes in said support member;

said body and said hook members are integrally constructed with substantially the same thickness by extrusion molding;

wherein the body further includes a flange having a shape that widens toward an edge side so that a cross-sectional shape of the flange is curved on an upper end portion of an entire periphery of said substantially rectangular frame-shaped side walls;

wherein each hook member includes a plurality of horizontally spaced apart rib portions extending from the flange downwards to the side walls.

\* \* \* \* \*